US007359219B2

(12) United States Patent
Erdl et al.

(10) Patent No.: US 7,359,219 B2
(45) Date of Patent: Apr. 15, 2008

(54) POWER SUPPLY (75) Inventors: Bernhard Erdl, Munich (DE); Heiner Friedrich, Lobenstein (DE)

(73) Assignee: Puls GMGH, Munich (DE)

( * ) Notice: Subject to any disclaimer, the term of this patent is extended or adjusted under 35 U.S.C. 154(b) by 121 days.

(21) Appl. No.: 11/301,256

(22) Filed: Dec. 13, 2005

(65) Prior Publication Data
US 2006/0193153 A1 Aug. 31, 2006

(30) Foreign Application Priority Data
Dec. 20, 2004 (DE) ............ 10 2004 061 341

(51) Int. Cl.
*H02M 3/335* (2006.01)
(52) U.S. Cl. ............ 363/16; 323/222; 323/259; 323/266; 323/282; 323/284; 323/286; 323/288; 363/16; 363/17; 363/89
(58) Field of Classification Search ........ 323/222, 323/259, 266, 282, 284, 286, 288; 363/16, 363/17, 89
See application file for complete search history.

(56) References Cited

U.S. PATENT DOCUMENTS

| | | | | |
|---|---|---|---|---|
| 4,429,269 A | * | 1/1984 | Brown | 323/301 |
| 4,533,986 A | * | 8/1985 | Jones | 363/17 |
| 4,672,523 A | | 6/1987 | Ari et al. | |
| 4,841,220 A | * | 6/1989 | Tabisz et al. | 323/282 |
| 5,066,900 A | * | 11/1991 | Bassett | 323/224 |
| 5,410,467 A | * | 4/1995 | Smith et al. | 363/131 |
| 5,486,752 A | * | 1/1996 | Hua et al. | 323/222 |
| 5,563,777 A | * | 10/1996 | Miki et al. | 363/37 |
| 5,668,466 A | * | 9/1997 | Vinciarelli et al. | 323/282 |
| 5,691,629 A | * | 11/1997 | Belnap | 323/266 |
| 5,714,863 A | * | 2/1998 | Hwang et al. | 320/166 |
| 5,745,351 A | * | 4/1998 | Taurand | 363/20 |
| 6,100,673 A | * | 8/2000 | Bair et al. | 323/255 |
| 6,538,906 B1 | * | 3/2003 | Ke et al. | 363/21.02 |
| 6,781,351 B2 | * | 8/2004 | Mednik et al. | 323/222 |
| 7,046,525 B2 | * | 5/2006 | Smidt et al. | 363/21.12 |
| 7,221,107 B2 | * | 5/2007 | Melis | 315/291 |
| 2001/0015900 A1 | * | 8/2001 | Preller | 363/16 |
| 2001/0026458 A1 | * | 10/2001 | Geissler | 363/16 |
| 2002/0008501 A1 | * | 1/2002 | Telefus et al. | 323/282 |

(Continued)

FOREIGN PATENT DOCUMENTS

DE 19548 724 A1 12/1995

(Continued)

OTHER PUBLICATIONS

Robert W. Erickson, Dragan Maksimovic, Fundamentals of Power Electronics, 2003, second edition, pp. 740-743.*

*Primary Examiner*—Bao Q. Vu
*Assistant Examiner*—M'baye Diao
(74) *Attorney, Agent, or Firm*—Miles & Stockbridge P.C.; Edward J. Kondracki (57) ABSTRACT A power supply, including a step-up converter, a resonant converter, and control unit. The step-up converter is connected to the resonant converter; the step-up converter and the resonant converter are each connected to the primary control unit.

18 Claims, 5 Drawing Sheets

U.S. PATENT DOCUMENTS

| | | | |
|---|---|---|---|
| 2003/0029863 A1* | 2/2003 | Morrison | 219/628 |
| 2003/0052658 A1* | 3/2003 | Baretich et al. | 323/284 |
| 2004/0183513 A1* | 9/2004 | Vinciarelli | 323/284 |
| 2004/0189095 A1* | 9/2004 | Lin et al. | 307/43 |
| 2006/0132102 A1* | 6/2006 | Harvey | 320/166 |

FOREIGN PATENT DOCUMENTS

| | | |
|---|---|---|
| DE | 19581 532 T1 | 1/1997 |
| EP | 1 331 723 A2 | 7/2003 |
| WO | WO 01/89754 A2 | 11/2001 |

* cited by examiner

POWER SUPPLY

CROSS REFERENCE TO RELATED APPLICATIONS

This application is related to application of Bernhard Erdl and Hubert Schonberger, entitled "Circuit Arrangement for Overvoltage Detection and Method for Operating Circuit Arrangement", filed Dec. 8, 2005, and assigned Ser. No. 11/296,703. The subject matter of said application is hereby incorporated by reference and a claim for the benefit of the filing date of said application is made under the provision of 35 USC 120.

BACKGROUND OF THE INVENTION

1. Field of the Invention

The invention relates to a power supply, in particular a power pack, a switching power supply, or a switched mode power supply.

2. Description of Related Art

Power supplies, in particular switching power supplies, switched mode power supplies, and primarily and secondarily clocked switching controllers are known from document [1]. Every electrical power-consuming device must be supplied with electric power furnished by a power supply or power pack. All over the world, power lines are used as transmission lines to supply current or voltage to virtually every kind of electrical appliance via electrical outlets. To this end, the power lines supply standard AC voltages, e.g. 120 volts in the USA and 230 volts in Germany.

For electrical power-consuming devices that require supply voltages lower than the voltage of the power line, however, the supply from the power lines must be transformed to the desired (DC) voltage. The voltage is reduced by means of the power pack mentioned at the beginning. Preferably, the power pack transforms the line voltage of for example 220 volts down to a DC voltage of for example 12 volts, which serves to operate the electrical and electronic power-consuming devices.

SUMMARY OF THE INVENTION

The object of the invention is to disclose a power supply of high efficiency and small dimensions.

This object is attained according to the defining characteristics of the independent claim. Modifications of the invention are disclosed in the dependent claims.

The term power supply is understood here in particular to mean a circuit arrangement that supplies electrical power or that modifies supplied electrical power, e.g. from a power supply network. The power supply can also be embodied as part of a circuit that has the same properties, e.g. part of a power pack, a switched mode power supply, or a switching power supply.

In order to attain this object, the invention proposes a power supply that includes a step-up converter, a resonant converter, and a control unit. The step-up converter is connected to the resonant converter, and the step-up converter and the resonant converter are each connected to the primary control unit.

In one modification, a step-down converter precedes the step-up converter; and the step-down converter is connected to the primary control unit.

The signal to be processed, in particular the (line) voltage to be adapted, is optionally transmitted here from the step-down converter to the step-up converter in the resonant converter. The primary control unit advantageously handles the triggering in particular of the active components of the step-down converter, the step-up converter, and the resonant converter. The arrangement presented here, in particular the combination of the above-mentioned components, namely the step-down converter, the step-up converter, and the resonant converter in combination with the primary control unit, makes it possible to create a power supply with a particularly high efficiency. It is possible to achieve an efficiency on the order of 95% in a three-phase supply network. Advantageously, the reduced heat buildup of the power supply allows the power supply to fit into a small housing. Another advantage lies in the fact that a separate electrolytic capacitor at the input is not required in order to decouple the input signal, which further increases the efficiency of the proposed power supply.

In one modification, the secondary rectifier unit is embodied as active or passive. Particularly in the case of an actively embodied secondary rectifier unit, as well as with active components, e.g. electronic switches such as bipolar transistors, IGBTs, or MOSFETs, these active components are preferably triggered by the primary control unit.

In another modification, the step-down converter, the step-up converter, the resonant converter and the primary control unit are situated on a primary side of a transformer, which can in particular be a power transformer. In particular, the resonant converter includes a connection with a primary side of the transformer.

The primary control unit can trigger the active components on the primary side of the transformer.

The term transformer is generally understood to refer to an inductive coupling of the kind preferably produced by a power transformer by means of a primary side and secondary side.

In another embodiment, the power supply includes a fuse unit that preferably precedes the power supply. In particular, the fuse unit can precede the step-up converter or the combination of the step-down converter and step-up converter.

This fuse unit can be passively designed, i.e. without a connection to the primary control unit, and protects the circuit arrangement following it. Alternatively, the fuse unit is connected to the primary control unit; preferably, the primary control unit triggers at least one active component of the fuse unit.

According to an additional embodiment, the fuse unit includes a transient detection and/or a transient compensation. It is particularly advantageous here if the fuse unit filters out or compensates for transient phenomena, in particular temporary overvoltages, e.g. voltage pulses or voltage surges.

The term "transient detection" refers in particular to a unit whose function is to detect when the input voltage exceeds a predetermined threshold and to relay the information regarding this excess.

The transient detection unit advantageously permits early detection of an overvoltage pulse and makes it possible to protect the output from the overvoltage pulse directly through intervention of the transient detection unit or through an additional transient suppression unit or transient cancellation unit. The quick, dynamic, and effective detection of the overvoltage pulse permits consequent savings with regard to how voltage-proof the subsequent components in the output have to be, e.g. power semiconductors with low breakdown voltages, and permits savings with regard to loss-encumbered components, e.g. a large electrolytic capacitance at the input of the circuit arrangement.

In one modification, the use of an input inductance makes it possible to detect voltage surges and permits the primary control unit to take suitable steps before the power supply is damaged.

In another modification, the fuse unit has a malfunction shut-off that in particular, counteracts a malfunction in the power supply by switching the input of the power supply via the input of the fuse unit into a high-impedance state, i.e. "disconnecting" the input.

In a further modification, the primary control unit is connected to a secondary control unit via a transfer unit.

In yet another modification, the power supply includes a secondary rectifier unit that is connected to the secondary control unit. This yields an embodiment in which the secondary rectifier unit and the secondary control unit are situated on a secondary side of the transformer. Preferably, the secondary rectifier unit is connected to the secondary side of the transformer. Consequently, the resonant converter and the secondary rectifier unit are coupled to each other via the above-mentioned transformer. Preferably, this transformer is embodied in the form of a power transformer with different windings. Typically, the power transformer has a primary side (connected to the resonant converter) and a secondary side (connected to the secondary rectifier unit).

In still another modification, the secondary control unit is able to trigger the active components of the secondary side of the transformer.

In another embodiment, the secondary rectifier unit supplies a rectified output voltage. This rectified, preferably "regulated" output voltage can be used to operate various devices, circuits, or power-consuming devices. Examples of output voltages include DC voltages in a range from approximately 3 volts to approximately 48 volts, in particular 5 volts, 12 volts, and 24 volts.

In yet another embodiment, the transfer unit enables a galvanically separate signal transmission between the primary control unit and the secondary control unit. Preferably, the galvanically separate signal transmission occurs optically, inductively, or capacitively. Preferably, the transfer unit can include at least one optocoupler.

In a further modification, an AC line current or a DC current is present in the step-down converter or in the fuse unit (if provided). Consequently, the power supply proposed here does not absolutely have to be used with an alternating current, in particular an AC line current; it can also be used in a DC voltage network.

Also, the step-down converter (if provided) of the fuse unit can be preceded by an additional rectifier unit that rectifies an alternating current, in particular an AC line current.

It should in general be noted that it is not absolutely necessary for a line voltage to be present at the input of the step-down converter or the fuse unit (if provided); it is also possible for its input to be supplied with the voltages of internal (AC or DC) networks or self-generated supply networks. Alternatively, the power supply can also be used inside a device for further regulating the supply voltage.

According to another modification, the power supply is embodied in the form of a power pack, in particular a switched mode power supply.

According to a further modification, the power supply can be mounted on a mounting rail and/or installed in a switchgear cabinet.

In still another modification, the power supply is cooled, in particular by means of natural convection. The high efficiency of the power supply according to the invention makes it possible to eliminate additional active cooling and instead to simply use a natural convection cooling.

In one embodiment, the power supply has an output power on the order of 0.1 W to 10 kW.

Furthermore, the power supply can include bipolar transistors, IGBTs, or MOSFETs; in particular, diodes can be replaced by the above-mentioned components in order to increase efficiency.

In another modification, the step-down converter can be used for power factor correction. In power factor correction, power-consuming devices in the circuit, in particular capacitances and inductances of a circuit, should be compensated for by means of appropriate wiring. This produces capacitances and/or inductances that counteract the capacitive and/or inductive components of the circuit and thus largely compensate for them. With regard to power factor correction, the reader is hereby referred to document [2].

In a further modification, the control unit has at least one analog control component and/or at least one digital control component. The control unit can also have at least one microprocessor and/or at least one signal processor. This applies to both the primary control unit and the secondary control unit.

BRIEF DESCRIPTION OF THE DRAWINGS

Exemplary embodiments of the invention will be described below in conjunction with the drawings.

DESCRIPTION OF THE PREFERRED EMBODIMENTS

Figure 1:
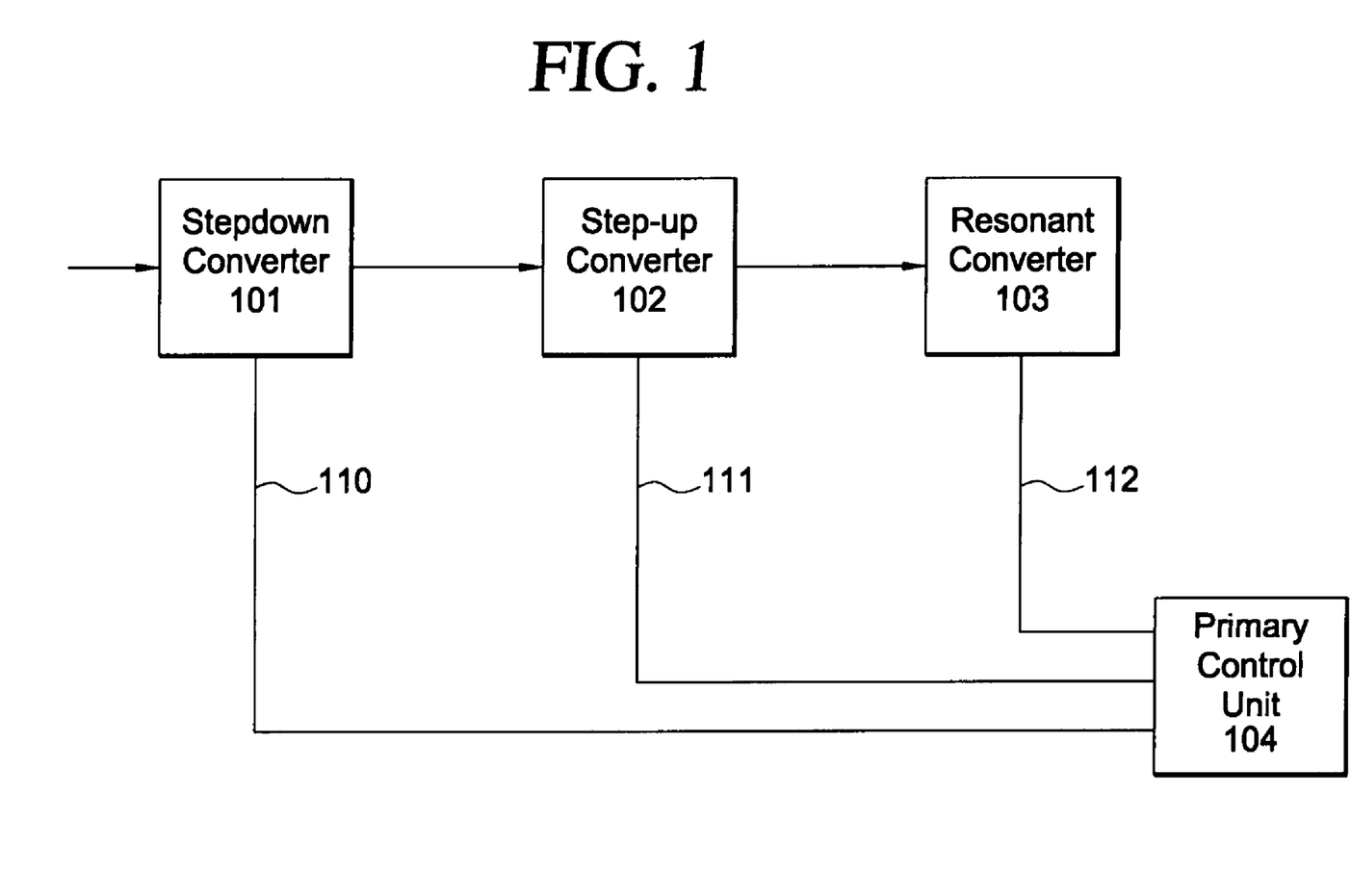
FIG. 1 is a block circuit diagram of a power supply.

FIG. 1 is a block circuit diagram of a power supply, having a step-down converter 101, a step-up converter 102, a resonant converter 103, and a primary control unit 104. An input signal supplied to the step-down converter 101 is transmitted or passed on from the step-down converter 101 to step-up converter 102 and then to the resonant converter 103 as shown by the heavily darkened arrows. The primary control unit 104 is connected via a control line 110 to the step-down converter 101, via a control line 111 to the step-up converter 102, and via a control line 112 to the resonant converter 103. Via the respective control lines 110, 111, and 112, the primary control unit 104 influences the active components of the individual components, namely the step-down converter 101, the step-up converter 102, and the resonant converter 103.

Optionally, the step-down converter 101 can be omitted and the input signal can be supplied directly to the step-up converter 102.

Figure 2:
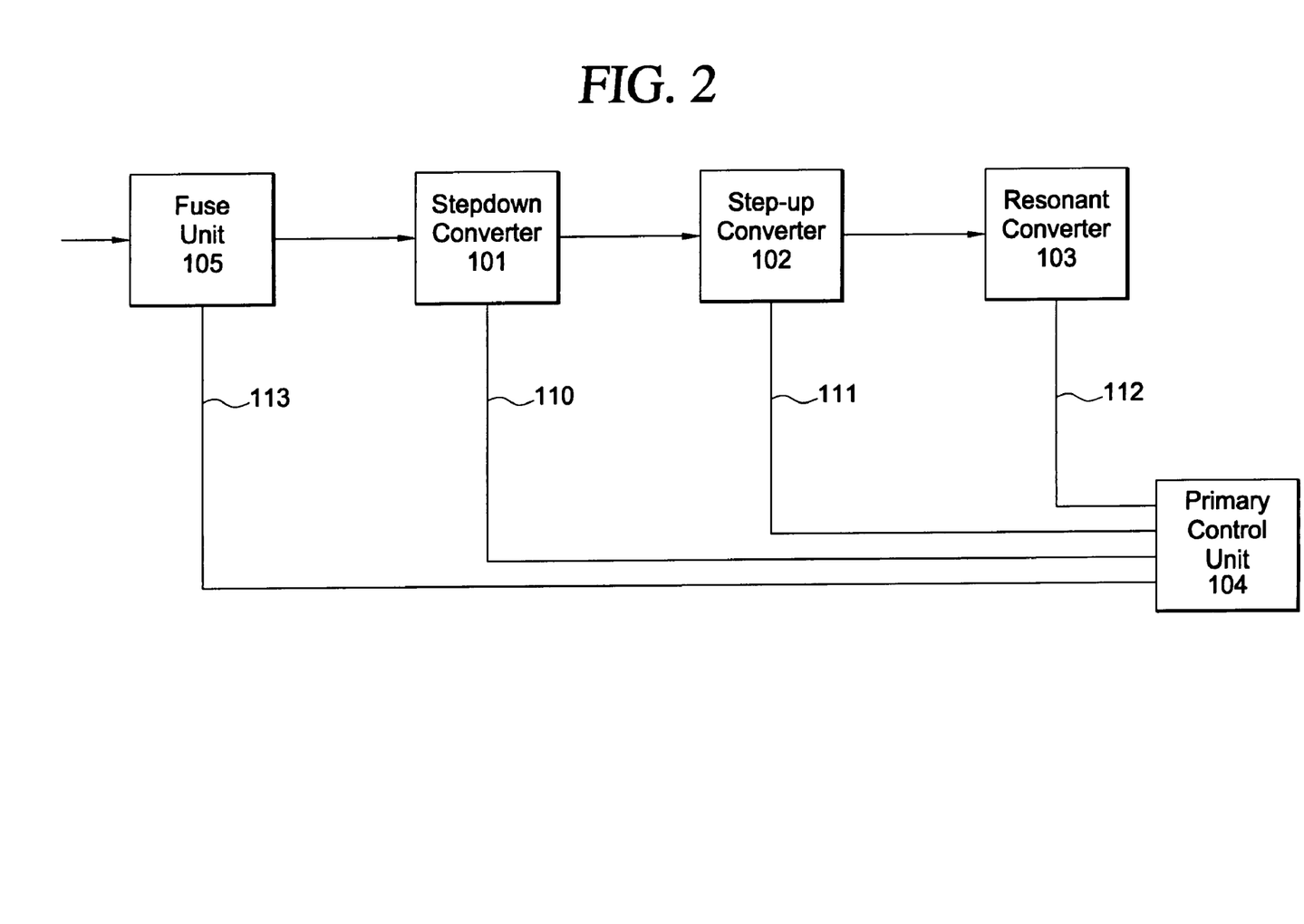
FIG. 2 is a block circuit diagram of a power supply with a fuse unit.

FIG. 2 is a block circuit diagram of a power supply with an additional fuse unit 105, which precedes the step-down converter 101 and is connected to the primary control unit 104 via a control line 113. If the fuse unit 105 has active components, then they are triggered by the primary control unit 104. The fuse unit 105 has means for filtering out and/or suppressing voltage surges, voltage pulses, overvoltages, and/or transients. Another function of the fuse unit 105 is the malfunction shut-off function, i.e. in the event of a malfunction of the power supply, the primary control unit 104 switches the input of the fuse unit 105 to a high-impedance state so that the signal flow is suppressed between the signal that is present in the fuse unit 105 and the subsequent circuit arrangement. To achieve this, the primary control unit can, for example, use an active switch component, e.g. an electronic switch in the fuse unit 105 to switch the input into the high-impedance state.

Optionally, it is also possible to omit the step-down converter 101 in the circuit of FIG. 2. The input signal would then be supplied to the step-up converter 102 directly via the fuse unit 105.

Figure 3:
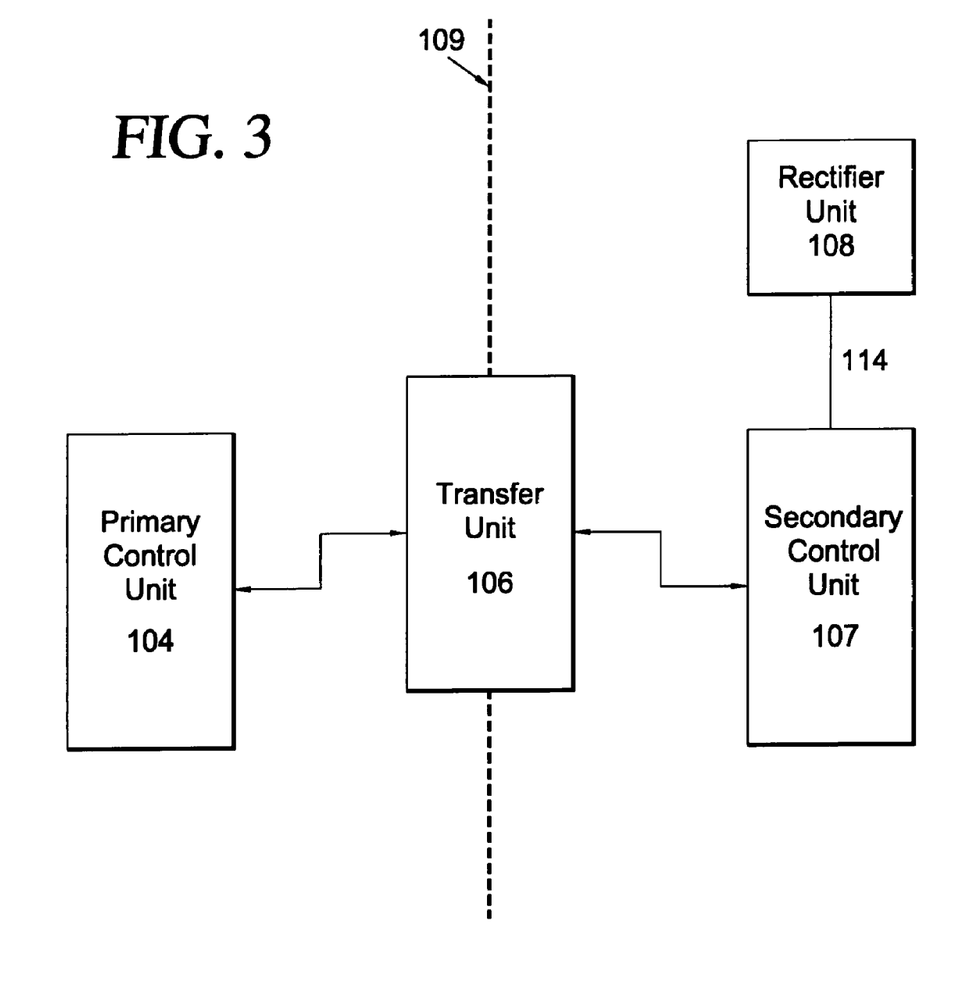
FIG. 3 is a block circuit diagram of the power supply according to FIGS. 1 and 2, with a coupling to the secondary side of a transformer.

FIG. 3 is a block circuit diagram of the power supply according to FIG. 1 or 2, with only the primary control unit illustrated for simplicity, the primary control unit 104 having a coupling or connection to the secondary side of a transformer. Preferably, the primary control unit 104 and the secondary control unit 107 are connected to each other via a transfer unit 106. A secondary rectifier unit 108 is connected to the secondary control unit 107 via a control line 114. The transfer unit 106 is preferably embodied in the form of a galvanically separate transforming unit having line isolation. This galvanic separation or "line isolation" is indicated by the dashed line 109.

FIG. 3 represents an extension of FIG. 1 or FIG. 2 by showing the "right side" of the primary control unit 104, i.e. the respective connection of the primary control unit 104 via the transfer unit 106 to the secondary side (secondary control unit 107 connected to the secondary rectifier unit 108). In addition, the resonant converter 103 and the secondary rectifier unit 108 are inductively coupled via a transformer, in particular a power transformer with primary and secondary windings.

Figure 4:
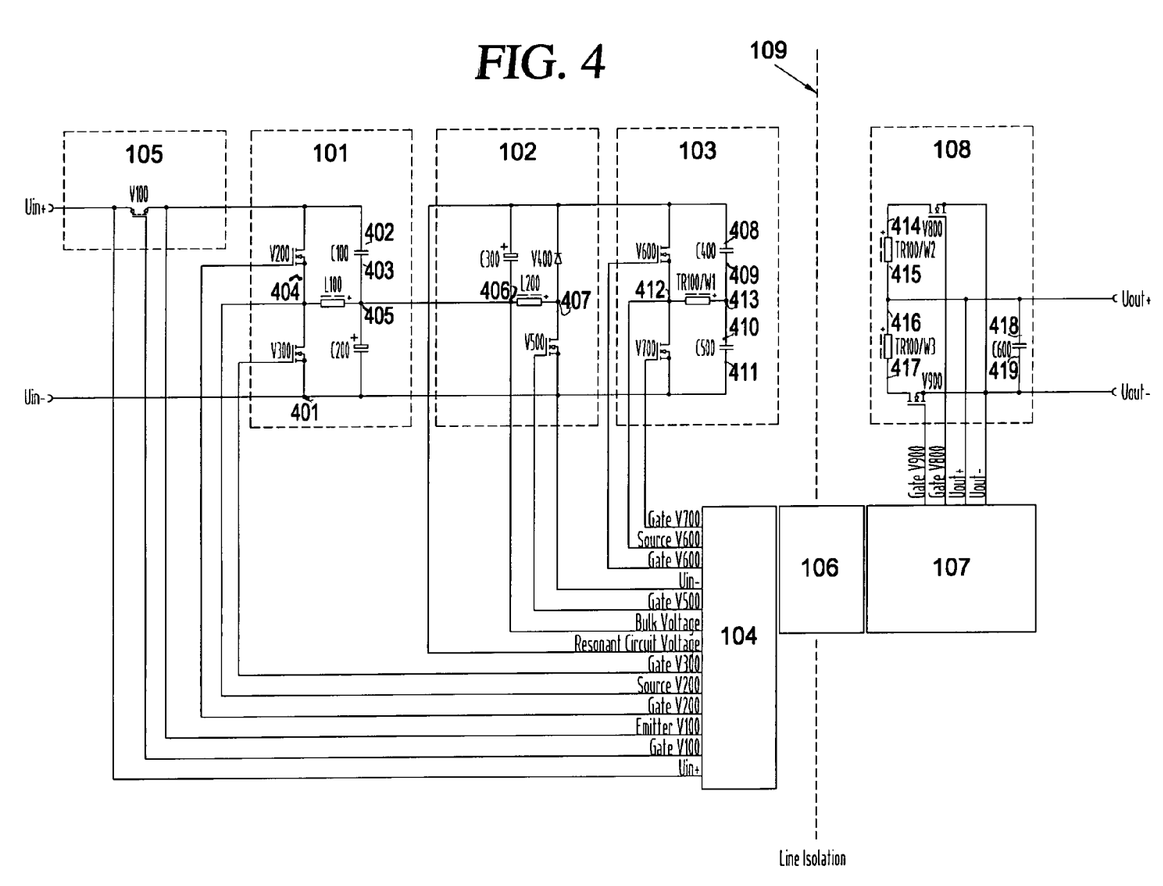
FIG. 4 is a wiring diagram of a power supply.

FIG. 4 is a wiring diagram of a power supply according to the preceding block circuit diagrams in FIGS. 1, 2, and 3, in a detailed example of a possible wiring.

The power supply according to FIG. 4 has connections Uin+ and Uin− at the input and has connections Uout+ and Uout− at the output. The input signal is preferably a roughly rectified AC line voltage; a regulated DC current, e.g. in a range from 3 volts to 48 volts, is available at the output. Depending on its design, the power supply can supply different levels of power.

The fuse unit 105 includes a switching transistor V100, whose connections (gate, emitter, and collector) are each connected to the primary control unit 104 (signals "gate V100", "emitter V100", and "Uin+"). In addition, the collector of the switching transistor V100 is connected to the Uin+ connection.

The step-down converter 101 includes a switching transistor V200, a freewheeling diode that in this case is embodied as a MOSFET V300, an (input assist) capacitor C100 (with connections 402 and 403), a (charge) capacitor C200 (electrolytic capacitor), and a storage throttle L100 (with connections 404 and 405). The drain connection of the switching transistor V200 is connected to the emitter of the switching transistor V100 and the connection 402 of the capacitor C100. The other connection 403 of the capacitor C100 is connected to the connection 405 of the storage throttle L100 and to the positive connection of the electrolytic capacitor C200. The connection 404 of the storage throttle L100 is connected to the source connection of the switching transistor V200, the drain connection of the MOSFET V300, and the primary control unit 104 (signal "source V200"). The source connection of the MOSFET V300 is connected to the connection Uin− and to the negative pole of the electrolytic capacitor C200. This node point will be referred to henceforth as node 401 and is also connected as signal "Uin−" to the primary control unit 104. In addition, the gate connection of the switching transistor V200 and the gate connection of the MOSFET it V300 are each separately connected to the primary control unit 104 (signals "gate V200" and "gate V300").

The step-up converter 102 includes a freewheeling diode V400, a switching transistor V500, a (charge) capacitor C300, and a storage throttle C200 (with connections 406 and 407).

The charge capacitor C300 is embodied in the form of an electrolytic capacitor; its positive pole is connected to the cathode of the freewheeling diode V400 and to the primary control unit 104 (signal "resonant circuit voltage"). The connection 406 of the storage throttle L200 is connected to the negative pole of the electrolytic capacitor C300, to the connection 403 of the storage throttle L100 (and therefore also to the connection 405 of the storage throttle L100 and the positive pole of the electrolytic capacitor C200), and to the primary control unit 104 (signal "bulk voltage"). The connection 407 of the storage throttle L200 is connected to the anode of the freewheeling diode V400 and to the drain connection of the switching transistor V500. The gate connection of the switching transistor V500 is connected to the primary control unit 104 (signal "gate V500"); the source connection of the switching transistor V500 is connected to the node 401.

The resonant converter 103 includes a switching transistor V600, a switching transistor V700, (resonant) capacitors C400 (with connections 408 and 409) and C500 (with connections 410 and 411), and a primary winding of a resonant transformer TR100/W1 (with connections 412 and 413). The connection 408 of the capacitor C400 is connected to the drain connection of the switching transistor V600 and to the cathode of the freewheeling diode V400 (and therefore also to the positive pole of the electrolytic capacitor C300 and the primary control unit 104). The connection 409 of the capacitor C400 is connected to the connection 413 of the primary winding of the resonant transformer TR100/W1 and to the connection 410 of the capacitor C500. The connection 411 of the capacitor C500 is connected to the source connection of the switching transistor V700 and the node 401. The connection 412 of the primary winding of the resonant transformer TR100/W1 is connected to the source connection of the switching transistor V600, the drain connection of the switching transistor V700, and the primary control unit 104 (signal "source V600"). Furthermore, the gate connection of the switching transistor V600 and the gate connection of the switching transistor V700 are separately connected to the primary control unit 104 (signals "gate V600" and "gate V700").

The primary control unit 104 is connected via the transfer unit 106 to the secondary control unit 107. A dashed line 109 indicates the line isolation, i.e. the separation between the primary side and secondary side of the resonant transformer TR100. The secondary control unit 107 is connected to the secondary rectifier unit 108.

The secondary rectifier unit 108 includes a switching transistor V800, a switching transistor V900, a charge capacitor C600 (with connections 418 and 419), a secondary winding of the resonant transformer TR100/W2 (with connections 414 and 415) and an additional secondary winding of the resonant transformer TR100/W3 (with connections 416 and 417).

The connection 414 of the secondary winding TR100/W2 is connected to the drain connection of the switching transistor V800. The connection 415 of the secondary winding TR100/W2 is connected to connection 416 of the secondary winding TR100/W3, the secondary control unit 107 (signal "Uout+"), the connection 418 of the capacitor C600, and the connection Uout+. The remaining connection 417 of the secondary winding TR100/W3 is connected to the drain connection of the switching transistor V900. The source connection of the switching transistor V800 is connected to the source connection of the switching transistor V900, the connection 419 of the capacitor C600, the secondary control unit 107 (signal "Uout–"), and the connection Uout–. In addition, the gate connections of the switching transistor V900 and the switching transistor V800 are separately connected to the secondary control unit 107 (signals "gate V900" and "gate V800").

Figure 5:
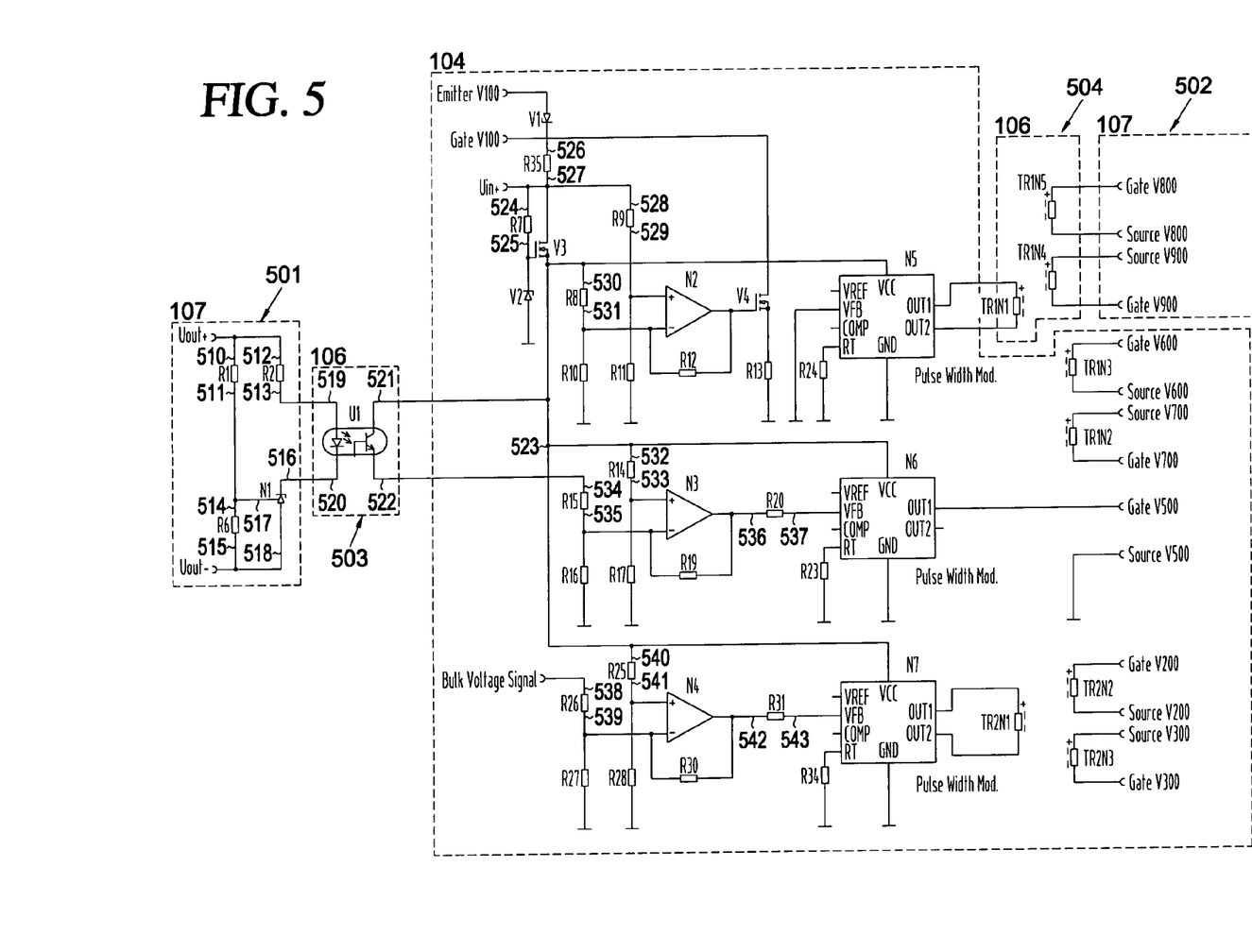
FIG. 5 is a wiring diagram of the components 104, 106, and 108 from FIG. 4.

FIG. 5 is an alternative wiring diagram of the components in FIG. 4, namely the primary control unit 104, the transfer unit 106, and the secondary control unit 107. The secondary control unit 107 is subdivided into the blocks 501 and 502 and the transfer unit 106 is subdivided into the blocks 503 and 504.

The block 501 includes the signals "Uout+" and "Uout–", resistors R1 (with the connections 510 and 511), R2 (with the connections 512 and 513), and R6 (with the connections 514 and 515), and a variable gain amplifier N1 with a reference (with connections 516, 517, and 518), which can optionally also be embodied in the form of a Zener diode (where the connection 516 corresponds to the cathode of the Zener diode, the connection 518 corresponds to the anode of the Zener diode, and the connection 517 corresponds to the reference).

The signal "Uout+" is connected to the connection 510 of the resistor R1 and the connection 512 of the resistor R2. The connection 511 of the resistor R1 is connected to the connection 514 of the resistor R6 and to the connection 517 of the variable gain amplifier N1. The signal "Uout–" is connected to the connection 515 of the resistor R6 and to the connection 518 of the variable gain amplifier N1.

The block 503 includes an optocoupler U1 with connections 519, 520, 521, and 522; on the primary side, the connection 519 is connected to the anode of the light emitting diode of the optocoupler U1 and the connection 520 is connected to the cathode of the light emitting diode of the optocoupler U1. The connections 521 and 522 constitute the secondary side of the optocoupler U1.

The connection 519 of the optocoupler U1 is connected to the connection 513 of the resistor R2; the connection 520 of the optocoupler U1 is connected to the connection 516 of the variable gain amplifier N1.

The primary control unit 104 includes a number of signals "emitter V100", "gate V100", "Uin+", "bulk voltage", "gate V600", "source V600", "source V700", "gate V700", "gate V500", "source V500", "gate V200", "source V200", "source V300", and "gate V300". In addition, the primary control unit includes a (pulse-to-width) modulator N5 for the resonant converter 103, a (pulse-to-width) modulator N6 for the step-up converter 102, and a (pulse-to-width) modulator N7 for the step-down converter 101. Each modulator N5, N6, and N7 has a control input VFB, an input for determining the switching frequency RT, and two outputs OUT1 and OUT2. The primary control unit 104 also has a Zener diode V1 for limiting the voltage to the switching transistor V100, a Zener diode V2 as a reference for an auxiliary voltage generation, a MOSFET V3 for supplying the auxiliary voltage, a MOSFET V4 for switching off the switching transistor V100, and resistors R7 (with connections 524 and 525), R35 (with connections 526 and 527), R8 (with connections 530 and 531), R9 (with connections 528 and 529), R10, R11, R12, R13, R24, R14 (with connections 532 and 533), R15 (with connections 534 and 535), R16, R17, R19, R20 (with connections 536 and 537), R23, R25 (with connections 540 and 541), R26 (with connections 538 and 539), R27, R28, R30, R31 (with connections 542 and 543), and R34. The primary control unit 104 also includes a comparator N2 for transient disconnection (for triggering the switching transistor V100), an operational amplifier N3 for regulating the step-up converter voltage, and an operational amplifier N4 for regulating the step-down converter voltage. Finally, the primary control unit 104 also includes the secondary triggering windings TR1N2, TR1N3 of a triggering transformer TR1 and a triggering transformer TR2, with a primary winding TR2N1 and two secondary triggering windings TR2N2 and TR2N3.

The signal "emitter V100" is connected to the anode of the Zener diode V1. The cathode of the Zener diode V1 is connected to the signal "gate V100", the drain connection of the MOSFET V4, and the connection 526 of the resistor R35. The connection 527 of the resistor R35 is connected to the signal "Uin+", the connection 524 of the resistor R7, the connection 528 of the resistor R9, and the drain connection of the MOSFET V3. The connection 525 of the resistor R7 is connected to the gate connection of the MOSFET V3 and to the cathode of the Zener diode V2. The anode of the Zener diode V2 is connected to the ground potential. The source connection of the MOSFET V3 is connected to the connection 521 of the optocoupler U1. This connecting point will henceforth be referred to as node 523. The connection 529 of the resistor R9 is connected to the positive input of the comparator N2. The resistor R11 is situated between the positive input of the comparator N2 and the ground potential. The connection 530 of the resistor R8 is connected to the node 523 and to the input of the supply voltage Vcc of the modulator N5. The connection 531 of the resistor R8 is connected to the negative input of the comparator N2. The resistor R10 is situated between the negative input of the comparator N2 and the ground potential. The resistor R12 is situated between the negative input of the comparator N2 and the output of the comparator N2; the output of the comparator N2 is also connected to the gate connection of the MOSFET V4. The resistor R13 is situated between the source connection of the MOSFET V4 and the ground potential. The input VFB of the modulator N5 is connected to the ground potential. The provided input GND of the modulator N5 is likewise connected to the ground potential. The input RT of the modulator N5 is connected via the resistor R24 to the ground potential.

The node 523 is also connected to the input of the supply voltage Vcc of the modulator N6 and to the connection 532 of the resistor R14. The connection 533 of the resistor R14 is connected to the positive input of the operational amplifier N3. The resistor R17 is connected to the input of the operational amplifier N3 and to the ground potential. The connection 534 of the resistor R15 is connected to the connection 522 of the optocoupler U1. The remaining connection 535 of the resistor R15 is connected to the negative input of the operational amplifier N3. The negative input of the operational amplifier N3 is connected via the resistor R16 to the ground potential. The resistor R19 is situated between the negative input of the operational amplifier N3 and the output of the operational amplifier N3; the output of the operational amplifier N3 is also connected to the connection 536 of the resistor R20. The connection 537 of the resistor R20 is connected to the input VFB of the modulator N6. The input RT of the modulator N6 is connected via the resistor R23 to the ground potential. The provided input GND of the modulator N6 is likewise connected to the ground potential. The output OUT1 of the modulator N6 is connected to the signal "gate V500". The signal "source V500" is connected to the ground potential.

The node 523 is also connected to connection 540 of the resistor R25 and to the input of the supply voltage Vcc of the modulator N7. The connection 541 of the resistor R25 is connected to positive input of the operational amplifier N4. In addition, the positive input of the operational amplifier N4 is connected via the resistor R28 to the ground potential. The signal "bulk voltage" is connected to the connection 538 of the resistor R26; the connection 539 of the resistor R26 is connected to the negative input of the operational amplifier N4. In addition, the negative input of the operational amplifier N4 is connected via the resistor R27 to the mass potential. The resistor R30 is connected between the negative input and the output of the operational amplifier N4. The output of the operational amplifier N4 is also connected to the connection 542 of the resistor R31; the connection 543 of the resistor R31 is connected to the input VFB of the modulator N7. The input RT of the modulator N7 is connected via the resistor R34 to the ground potential. The provided input GND of the modulator N7 is likewise connected to the ground potential. The primary winding TR2N1 of the triggering transformer TR2 is connected between the outputs OUT1 and OUT2 of the modulator N7.

The primary control unit 104 also includes the triggering winding TR2N2, whose one connection is connected to the signal "gate V200" and whose other connection is connected to the signal "source V200". The one connection of the triggering winding TR2N3 is connected to the signal "source V300" and the other connection is connected to the signal "gate V300".

The triggering winding TR1N2 is connected to the signal "gate V700" at one end and to the signal "source V700" at the other; the triggering winding TR1N3 is connected to the signal "source V600" at one end and to the signal "gate V600" at the other.

The block 504 includes the primary winding TR1N1 of the triggering transformer TR1 and the secondary triggering windings TR1N4 and TR1N5. The primary winding TR1N1 is connected to the output OUT1 at one end and to the output OUT2 of the modulator N5 of the primary control unit 104 at the other.

The block 502 includes the signals "gate V800", "source V800", "source V900", and "gate V900".

The signals "gate V800" and "source V800" are connected to the two connections of the triggering winding TR1NR from block 504 and the signals "source V900" and "gate V900" are connected to the two connections of the triggering winding TR1N4 from block 504.

Operation of the Components:
a. Function description of the fuse unit 105:
    The fuse unit 105 serves in particular to suppress overvoltages and transients that can reach the circuit arrangement, e.g. via power lines. In addition, in the event of a malfunction of the power supply itself, the fuse unit 105 can be switched into a high-impedance state and consequently be "disconnected" from the input signal.
b. Function description of the step-down converter 101:
    The step-down converter 101 serves to reduce and stabilize the input voltage, in particular the line voltage, to a predetermined voltage. In addition, the step-down converter 101 is used for power factor correction, i.e. to compensate for possible inductive and/or capacitive loads. In order to increase the efficiency of the power supply, the freewheeling diode V300 can be advantageously replaced by a MOSFET.
c. Function description of the step-up converter 102:
    The step-up converter 102 serves to regulate the resonant converter voltage in accordance with a set output voltage, to limit an output current, and to provide a definite assistance interval in the event of a blackout. In addition, the electrolytic capacitor C300 filters out a ripple voltage in order to prevent the ripple voltage from affecting the DC output (connections Uout+ and Uout−).
d. Function description of the resonant converter 103:
    The resonant converter 103 serves to transmit the output power with a correspondingly high efficiency to the secondary side and to convert the line isolation required for it.
e. Function description of the secondary rectifier unit 108:
    The secondary rectifier unit 108 represents an active rectification of the secondary-side AC current of the resonant converter; the switching transistors V800 and V900, in particular, permit a high degree of efficiency to be achieved. Optionally, when there are lower efficiency demands to be met, a rectification by means of diodes can be used instead of the above-mentioned switching transistors.
f. Function description of the primary control unit 104:
    The primary control unit 104 is used for regulating and controlling the functions of the primary side and for triggering in particular the active components. To this end, the primary control unit 104 can be of an analog and/or digital design. In particular, the primary control unit 104 can have at least one microprocessor, at least one digital signal processor, or a combination of these.
g. Function description of the secondary control unit 107:
    The secondary control unit 107 is used for regulating and controlling the functions of the secondary side, including a triggering of the active components on the secondary side. The secondary control unit 107 can also be of an analog and/or digital design. In particular, the secondary control unit 107 can have at least one microprocessor, at least one digital signal processor, or a combination of these.
    Optionally, the control unit 107 on the secondary side can be omitted if it is not necessary to actively trigger the rectifier unit 108 on the secondary side.
h. Function description of the transfer unit 106:
    The transfer unit 106 assures a data transfer for regulating the output voltage and/or controlling the active rectifier (the secondary rectifier unit 108) across the line isolation 109. The data transfer here can occur optically, inductively, or capacitively. The transfer unit 106 can be omitted if the secondary-side regulation and/or triggering of the secondary rectifier unit 108 is/are executed from the primary side.

Operation of the Circuit:
The DC voltage supplied to the DC inputs Uin+ and Uin− first arrives at the fuse unit 105. The switching transistor V100 is "active", i.e. switched into a conductive state, provided that the transient shut-off by means of the comparator N2 is inactive in the primary control unit 104 and there is a sufficiently powerful input voltage arriving via the resistor R35 at the gate connection of the switching transistor V100. If the connection Uin+ is supplied with an input voltage above a predetermined threshold, then the comparator N2 switches into the conductive state, its output becomes conductive, and the MOSFET V4 is switched into the conductive state. Since the MOSFET V4 contains the current-limiting resistor R13 in its source branch, only one predetermined current is now supplied at the drain outlet of the MOSFET V4. This current flows in opposition to the current from the resistor R35 and thus achieves a discharging of the gate connection of the switching transistor V100, whereupon the switching transistor V100 switches into the high-impedance state and is disconnected. This mechanism thus protects the arrangement itself from a high input voltages by switching off the switching transistor V100.

When the switching transistor V100 is switched into the conductive state, the input voltage at the connection Uin+ reaches the step-down converter 101 and is converted into a constant output voltage. The intensity of this output voltage is determined by the variable gain amplifier N4. Depending on the voltage measured at the electrolytic capacitor C300, the variable gain amplifier N4 readjusts the pulse duty factor for the subsequent pulse-to-width modulation by means of the modulator N7 so that the determined voltage at the electrolytic capacitor C300 does not change when there is a change in the load or a change in the input voltage. The output of the variable gain amplifier N4 here acts via the resistor R31 on the modulator N7 in such a way that that the modulator N7 varies the pulse duty factor at its outputs OUT1 and OUT2 so that by means of the primary winding of the triggering transformer TR2N1 via the triggering winding of the triggering transformer TR2N2 for the switching transistor V200 and the triggering winding of the triggering transformer TR2N3 for the MOSFET V300, a constant voltage occurs in the electrolytic capacitor C300. In particular, the triggering energy for the triggering transformer TR2 is transmitted to the power MOSFETs V200 and V300.

The available voltage in the electrolytic capacitor C300 is thus supplied to the step-up converter 102. This is necessary since the resonant converter 103 used cannot be regulated and consequently cannot react to changes in the load and/or input voltage. This function is performed by the step-up converter 102, in concert with the variable gain amplifier N3, which is situated on the secondary side and monitors the output voltage of the secondary-side rectifier unit 108. Depending on the output voltage of the secondary-side rectifier unit 108 across the secondary-side control unit 107 (signals "Uout+" and "Uout−") and the optocoupler U1, the variable gain amplifier N3 in turn influences the pulse duty factor by means of the modulator N6 by triggering the gate connection of the switching transistor V500 in such a way that the resonant converter 103 always receives the voltage that it needs at the moment in order to maintain the output voltage.

The output voltage measured by the variable gain amplifier N1 in the secondary control unit 107 is compared to an internal reference voltage and, if it exceeds this reference voltage, leads to a current flow through the optocoupler U1. By means of the resistor R15 on the primary side, this current flow leads to an increase in the potential in the variable gain amplifier N3. As a result, in its output via the resistor R20, the pulse duty factor of the modulator N6 is reduced so that (via the triggering of the gate connection of the switching transistor V500 by means of the output of the modulator N6), the output voltage of the step-up converter 102 decreases and as a result, so does the input and output voltage of the resonant converter.

In this case, the modulator N5 preferably functions as a fixed frequency generator with a pulse duty factor of 50%.

Via the outputs of the modulator N5 OUT1 and OUT2 and the primary winding of the triggering transformer TR1N1, this pulse duty factor travels to the switching transistor V700 (connections "gate V700" and "source V700") via the triggering winding TR1N2 and to the switching transistor V600 (connections "gate V600" and "source V600") via the triggering winding TR1N3.

Likewise, the triggering transformer TR1 triggers the switching transistor V900 (connections "gate V900" and "source V900") via the triggering winding TR1N4 and triggers the switching transistor V800 (connections "gate V800" and "source V800") in the secondary rectifier unit 108 via the triggering winding TR1N5, which yields a further increase in efficiency.

The invention claimed is:

1. A power supply comprising,
a step-up converter (102);
a resonant converter (103) connected to the step-up converter (102);
a primary control unit (104) connected to the step-up converter (102) and the resonant converter (103);
a step-down converter (101) having an output connected to the step-up converter (102) and the primary control unit (104) being connected to the step-down converter (101);
the step-down converter (101), the step-up converter (102), the resonant converter (103), and the primary control unit (104) all being situated on a primary side of a transformer and the resonant converter (103) being connected to the primary side of the transformer, and
the primary control unit (104) being adapted to trigger active components on the primary side of the transformer and the primary control unit (104) including a secondary rectifier unit (108) adapted to supply a rectified output voltage and the primary control unit (104) being connected to a secondary control unit (107) via a transfer unit (106) and the secondary rectifier unit (108) being connected to the secondary control unit (107).

2. Power supply according to claim 1, in which the secondary rectifier unit (108) is passive.

3. Power supply according to claim 1 wherein the secondary rectifier unit (108) is of an active design.

4. Power supply according to claim 1, wherein the transfer unit (106) permits a galvanically separate signal transmission between the primary control unit (104) and the secondary control unit (107).

5. Power supply according to claim 4, wherein the galvanically separate signal transmission is carried out optically, inductively, or capacitively.

6. Power supply according to claim 5 wherein the transfer unit (106) includes an optocoupler.

7. Power supply according to claim 1, wherein the secondary rectifier unit (108) and the secondary control unit (107) are situated on a secondary side of a power transformer.

8. Power supply according to claim 1 wherein the secondary rectifier unit (108) is connected to a secondary side of the transformer, and the secondary control unit (107) is adapted to trigger active components of the secondary side of the transformer.

9. Power supply according to claim 1 wherein the step up converter, the resonant converter and the primary control unit are preceded by a fuse unit (105) and the primary control unit (104) is connected to the fuse unit (105).

10. Power supply according to claim 9 wherein the fuse unit (105) includes a transient detection and a transient compensation circuit and the fuse unit (105) includes a malfunction shut-off.

11. Power supply according to claim 9 wherein one of the step-down converter (101) or the fuse unit (105) is supplied with either an AC line voltage or a DC current.

12. Power supply according to claim 9 wherein one of the step-down converter (101) or the fuse unit (105) is preceded by a rectifier unit adapted to rectify an AC line voltage.

13. Power supply according to claim 1 wherein the power supply includes means for cooling the supply.

14. Power supply according to claim 1 wherein the power supply has an output power of 0.1 W to 10 kW.

15. Power supply according to claim 1 wherein the power supply includes bipolar transistors.

16. Power supply according to claim 1 wherein the step-down converter (101) provides for power factor correction.

17. Power supply according to claim 1 wherein the primary control unit (104) and secondary control unit (107) have at least one analog control component and at least one digital control component.

18. Power supply according to claim 1 wherein the control units (104, 107) have at least one microprocessor and at least one signal processor.

* * * * *

UNITED STATES PATENT AND TRADEMARK OFFICE
CERTIFICATE OF CORRECTION

PATENT NO. : 7,359,219 B2
APPLICATION NO. : 11/301256
DATED : April 15, 2008
INVENTOR(S) : Nernhard Erdl and Heiner Friedrich It is certified that error appears in the above-identified patent and that said Letters Patent is hereby corrected as shown below:

On Title Page

Item (30) Correct foreign application priority data to be:

10 2004 061 341.9

Signed and Sealed this

Fifteenth Day of July, 2008

JON W. DUDAS
*Director of the United States Patent and Trademark Office*

UNITED STATES PATENT AND TRADEMARK OFFICE
CERTIFICATE OF CORRECTION

PATENT NO. : 7,359,219 B2  Page 1 of 1
APPLICATION NO. : 11/301256
DATED : April 15, 2008
INVENTOR(S) : Bernard Erdl and Heiner Friedrich It is certified that error appears in the above-identified patent and that said Letters Patent is hereby corrected as shown below:

On title page
Item [73]
(73) Replace "GMGH" with --GmbH--

Signed and Sealed this

Seventh Day of October, 2008

JON W. DUDAS
*Director of the United States Patent and Trademark Office*